United States Patent
Ward et al.

(10) Patent No.: US 8,400,775 B2
(45) Date of Patent: Mar. 19, 2013

(54) CAPACITOR WITH DIRECT DC CONNECTION TO SUBSTRATE

(75) Inventors: Terence G. Ward, Redondo Beach, CA (US); George John, Cerritos, CA (US); Edward P. Yankoski, Corona, CA (US); David F. Nelson, Redondo Beach, CA (US); Gregory S. Smith, Woodland Hills, CA (US); James M. Nagashima, Cerritos, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 1639 days.

(21) Appl. No.: 11/774,329

(22) Filed: Jul. 6, 2007

(65) Prior Publication Data

US 2009/0009980 A1    Jan. 8, 2009

(51) Int. Cl.
*H05K 1/18*        (2006.01)
(52) U.S. Cl. .................. 361/763; 361/775; 361/803
(58) Field of Classification Search .............. 361/775, 361/803; 257/690–692
See application file for complete search history.

(56) References Cited

U.S. PATENT DOCUMENTS

| | | | | |
|---|---|---|---|---|
| 5,075,821 | A | * | 12/1991 | McDonnal ............... 361/721 |
| 5,291,065 | A | * | 3/1994 | Arai et al. ............... 257/723 |
| 6,359,331 | B1 | * | 3/2002 | Rinehart et al. .......... 257/691 |
| 6,845,017 | B2 | * | 1/2005 | Ahmed et al. ........... 361/775 |
| 2005/0270745 | A1 | | 12/2005 | Chen et al. |
| 2007/0109715 | A1 | | 5/2007 | Azuma et al. |

FOREIGN PATENT DOCUMENTS

| | | |
|---|---|---|
| JP | 9308265 A1 | 11/1997 |
| JP | 11136960 A | 5/1999 |
| JP | 2004254358 A | 9/2004 |

OTHER PUBLICATIONS

Chinese Office Action for Chinese Application 200810128265.4 mailed Mar. 22, 2011.
German Office Action for German Application 10 2008 031 491.9 mailed Dec. 10, 2012.

\* cited by examiner

*Primary Examiner* — Tuan T Dinh
(74) *Attorney, Agent, or Firm* — Ingrassia Fisher & Lorenz, P.C.

(57) ABSTRACT

A subcomponent is provided for a power inverter module. The apparatus comprises a capacitor having a terminal and integrated into a housing. A substrate is mounted on the housing. The substrate incorporates a power semiconductor switch and has at least one direct current (DC) tab. The direct current tab is directly connected to the terminal of the capacitor.

11 Claims, 7 Drawing Sheets

CAPACITOR WITH DIRECT DC CONNECTION TO SUBSTRATE

TECHNICAL FIELD

The present invention generally relates to power inverter modules, and more particularly relates to a subcomponent of a power inverter module, including a capacitor with a direct, direct current (DC) connection to a switch device which is integrated into or deposited over a substrate.

BACKGROUND OF THE INVENTION

Power inverter modules are commonly used in many applications. The automotive industry, for example, makes use of power inverters to convert direct current (DC) which is supplied from a battery to alternating current (AC) which is used to supply power to such devices as electric motors and traction drive systems.

Power inverter modules include a capacitor device, such as a so-called "DC link" capacitor, which is placed between a power semiconductor switch and the DC power supply. Use of a capacitor serves to steady input voltage variation.

Many high power-density power inverter modules employ liquid cooling, where the power switches are mounted on a liquid-cooled heat sink. The capacitor is placed adjacent to the switches. This increases the footprint of the overall package, and the length of the busbars between the capacitor and the switches, thereby increasing the package volume and the inductance of the busbar.

Accordingly, it is desirable to implement a design which places the capacitor as close to the switches as possible, which reduces the length of the busbar connections and the associated inductance of the busbar connections In addition, such a design should minimize the expenditure of additional resources and additional complexity. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In one embodiment, a subcomponent for a power inverter module is provided. A capacitor has a terminal and is integrated into a housing. A substrate is mounted on the housing. The substrate incorporating a power semiconductor switch and having at least one direct current (DC) tab. The at least one direct current tab is directly connected to the terminal of the capacitor.

In an additional embodiment, an apparatus is provided for a power inverter module component, including a housing. A capacitor is integrated into the housing and has an output terminal. A semiconductor switch device is integrated into a substrate and disposed over the housing. The substrate has an input tab structure. The input tab structure is directly coupled to the output terminal.

In still another embodiment, an apparatus is provided for a power inverter module. A capacitor is integrated into a housing. The capacitor has a plurality of output terminal leads corresponding to each of a plurality of direct current (D/C) connections. A plurality of semiconductor switch devices are disposed over a plurality of substrates and mounted over the housing. Each of the plurality of semiconductor switch devices is coupled to a plurality of input terminals extending from the plurality of substrates. Each of the plurality of input terminals are directly coupled to each of the plurality of output terminal leads.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
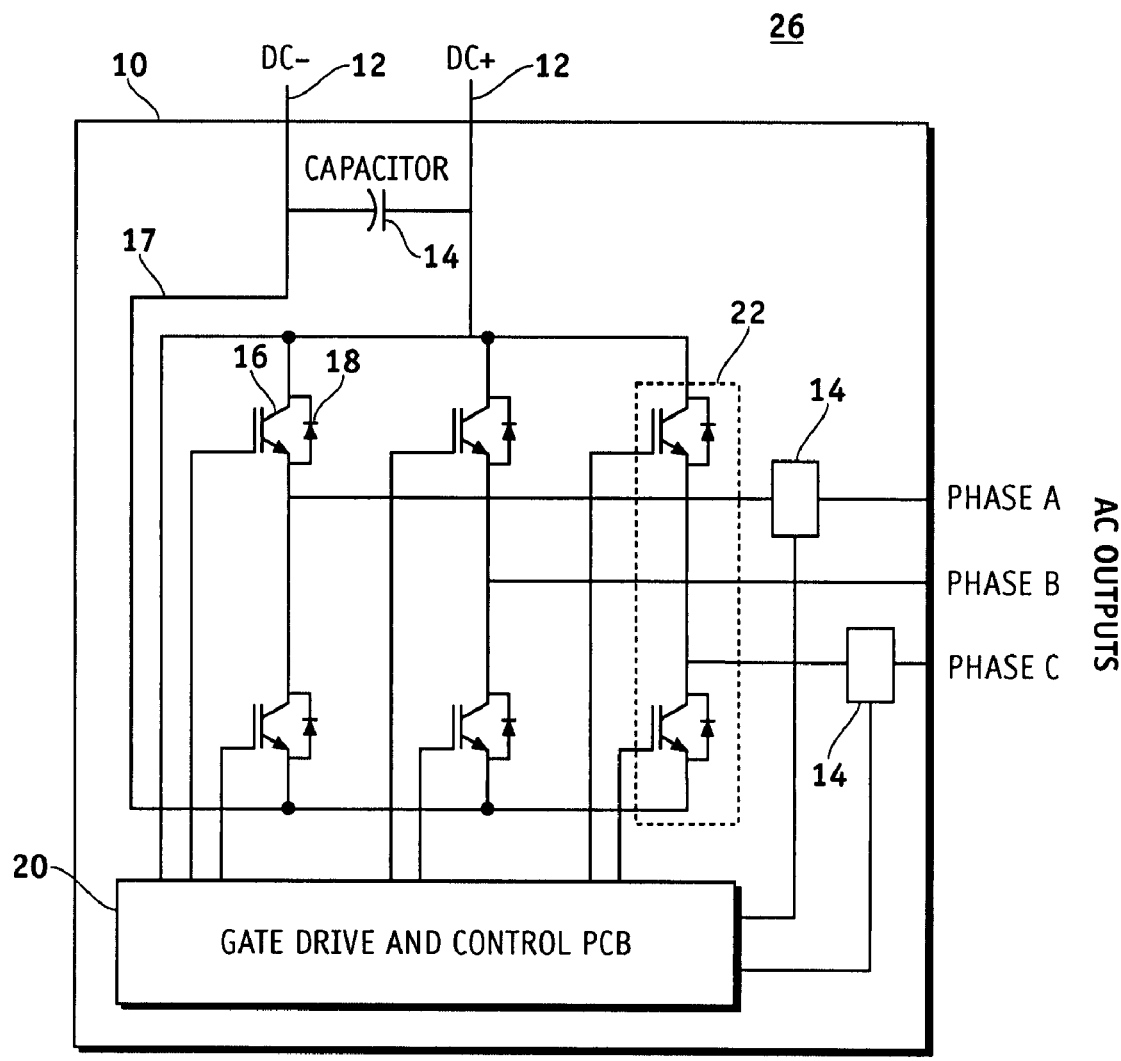
FIG. 1 illustrates an exemplary schematic diagram of a power inverter circuit.

FIG. 1 illustrates an exemplary schematic diagram of a three-phase power inverter circuit 10. Power inverter circuit 10 provides the previously described conversion of input DC power to an AC load, such as an electric motor. A DC power source is coupled to DC− and DC+ input terminals 12. A capacitor 14, such as the previously described DC link capacitor 14, is placed across the DC− and DC+ terminals 12. An output terminal of the capacitor 14 is connected to a transistor 16, such as an insulated gate bipolar transistor (IGBT) 16. The transistor is coupled in parallel with a diode 18 and controlled by a gate drive and control printed circuit board (PCB) (i.e., a controller). A series of two transistors 16 and diodes 18 make up a leg 22 of a three-phase switch device. Each of the three legs 22 are coupled to an AC output 26 representing an A, B, and C phase respectively. Again, it is desirable to limit the connections (e.g., lead 17) between the capacitor 14 and the switches 22, which reduces the length of corresponding busbar connections and the associated inductance of these busbar connections.

Figure 2:
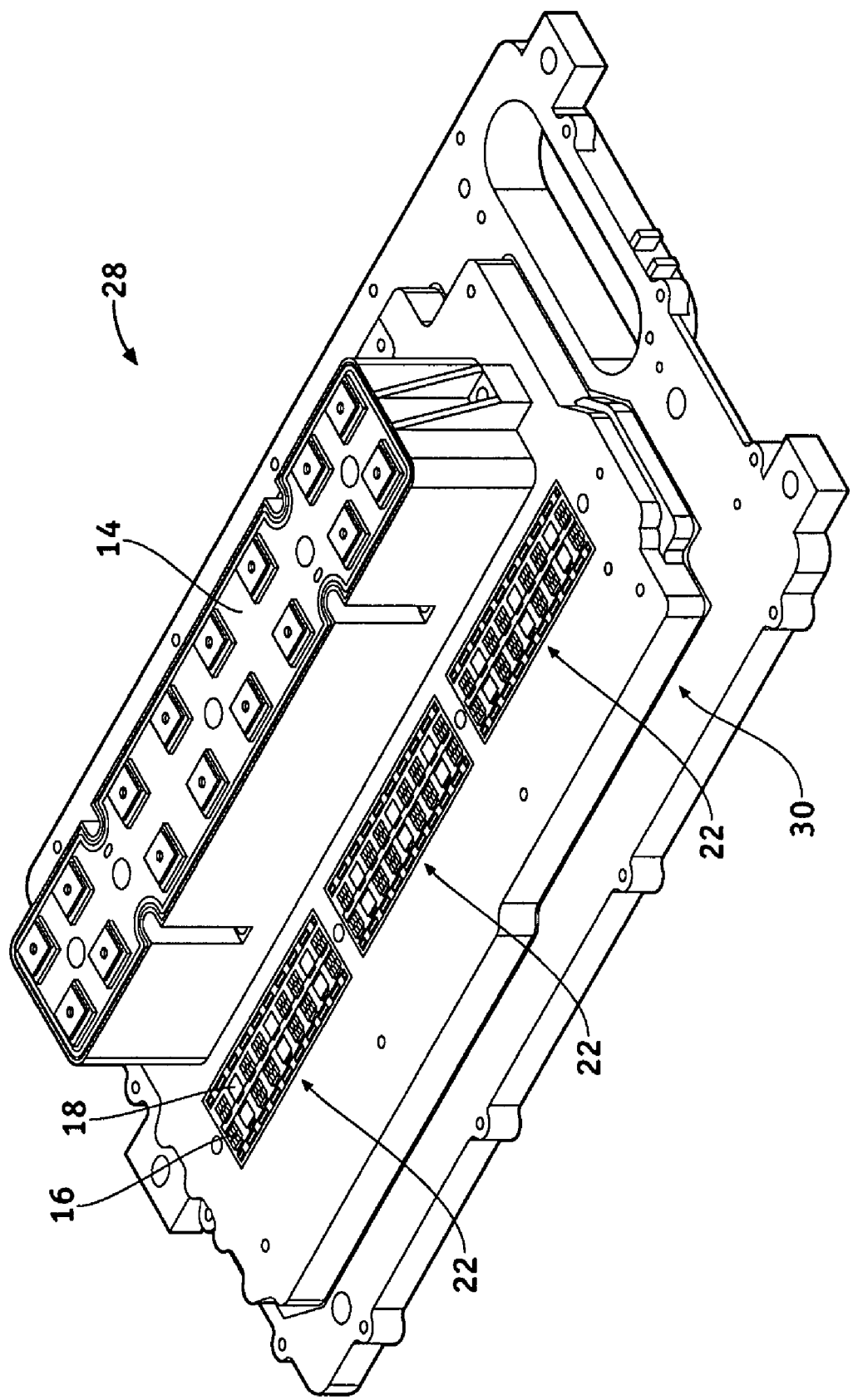
FIG. 2 illustrates a first exemplary component of a power inverter, where a substrate is mounted adjacent to a capacitor over a heat sink, shown in a three-dimensional representation.

Turning to FIG. 2, an exemplary portion 28 of a power inverter device is depicted. Portion 28 includes a capacitor which is mounted over a heatsink 30, commonly referred to as a "coldplate" 30. A series of power semiconductor switches 22 corresponding to each leg of the three-phase inverter are mounted adjacent to the capacitor 14.

The switches 22 include, again, a series of transistors 16 and diodes 18 which can be incorporated into one or more semiconductor dies. The switches 22, and thereby, the respective semiconductor dies, can be disposed over or integrated into a substrate. In one embodiment, the substrate can include a ceramic dielectric layer (i.e., aluminum nitride or aluminum oxide) which is sandwiched between two layers of copper. The substrate allows for electrical isolation of the switches 22. However, the substrate thermally conducts heat generated by the switches 22 through to the coldplate 30. A busbar (not shown), which is enclosed by the coldplate 30, electrically couples output terminals of the capacitor with input terminals of the switches 22.

Figure 3:
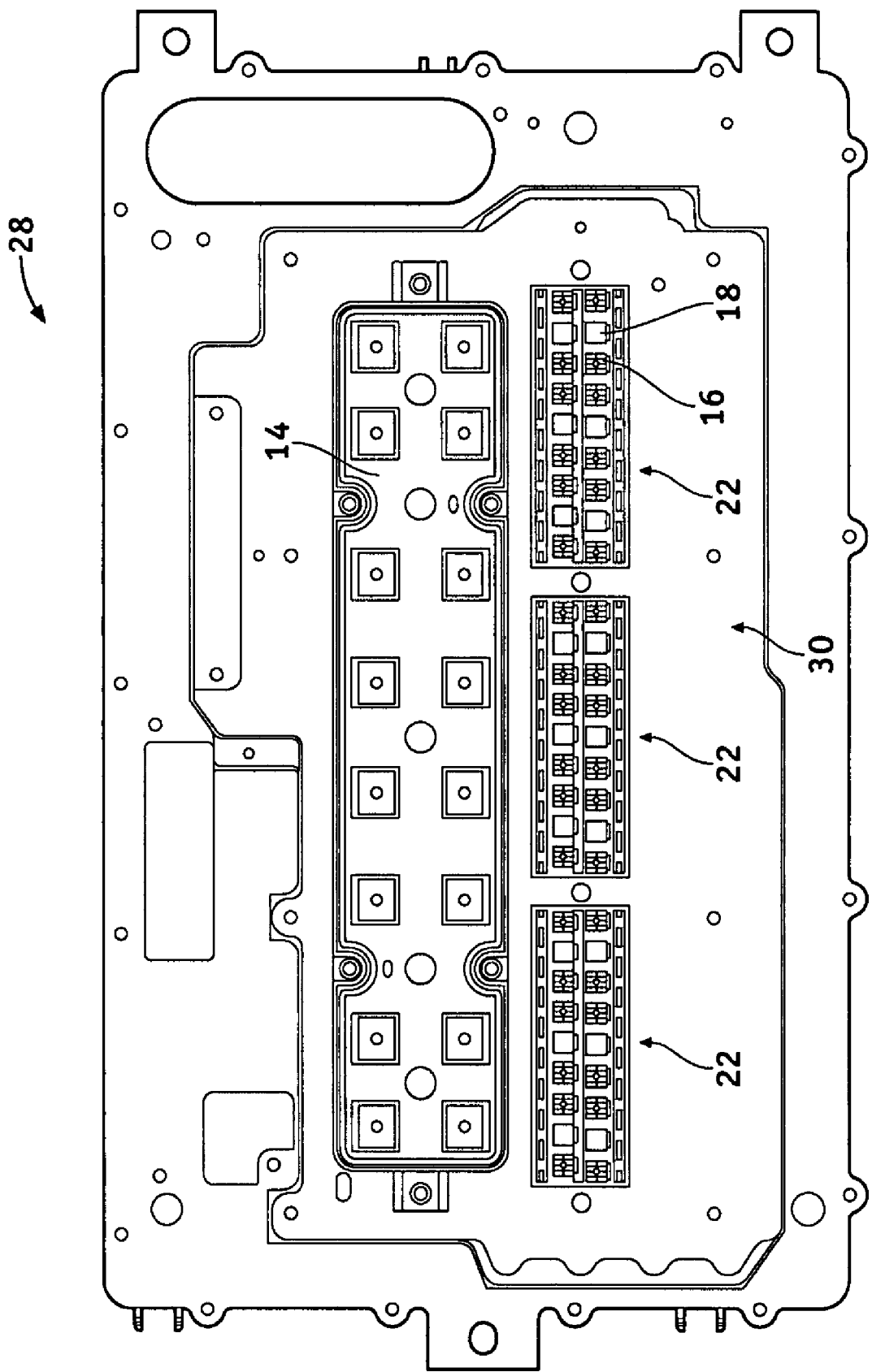
FIG. 3 illustrates a top view of the exemplary component of a power inverter depicted in FIG. 2.

FIG. 3 illustrates a top view representation of the configuration of portion 28 shown in FIG. 2. Here again, the capacitor 14 is mounted over the coldplate 30. The switches 22 are mounted to the coldplate 30 and adjacent to the capacitor 14 as shown. By mounting the switches adjacent to the capacitor, the length of the busbars connecting the capacitor and switches can contribute to such undesirable characteristics as signal losses and parasitic effects such as parasitic inductance of the busbar. In addition, the footprint of the package 28 is increased, resulting in an increased package 28 volume.

Figure 4:
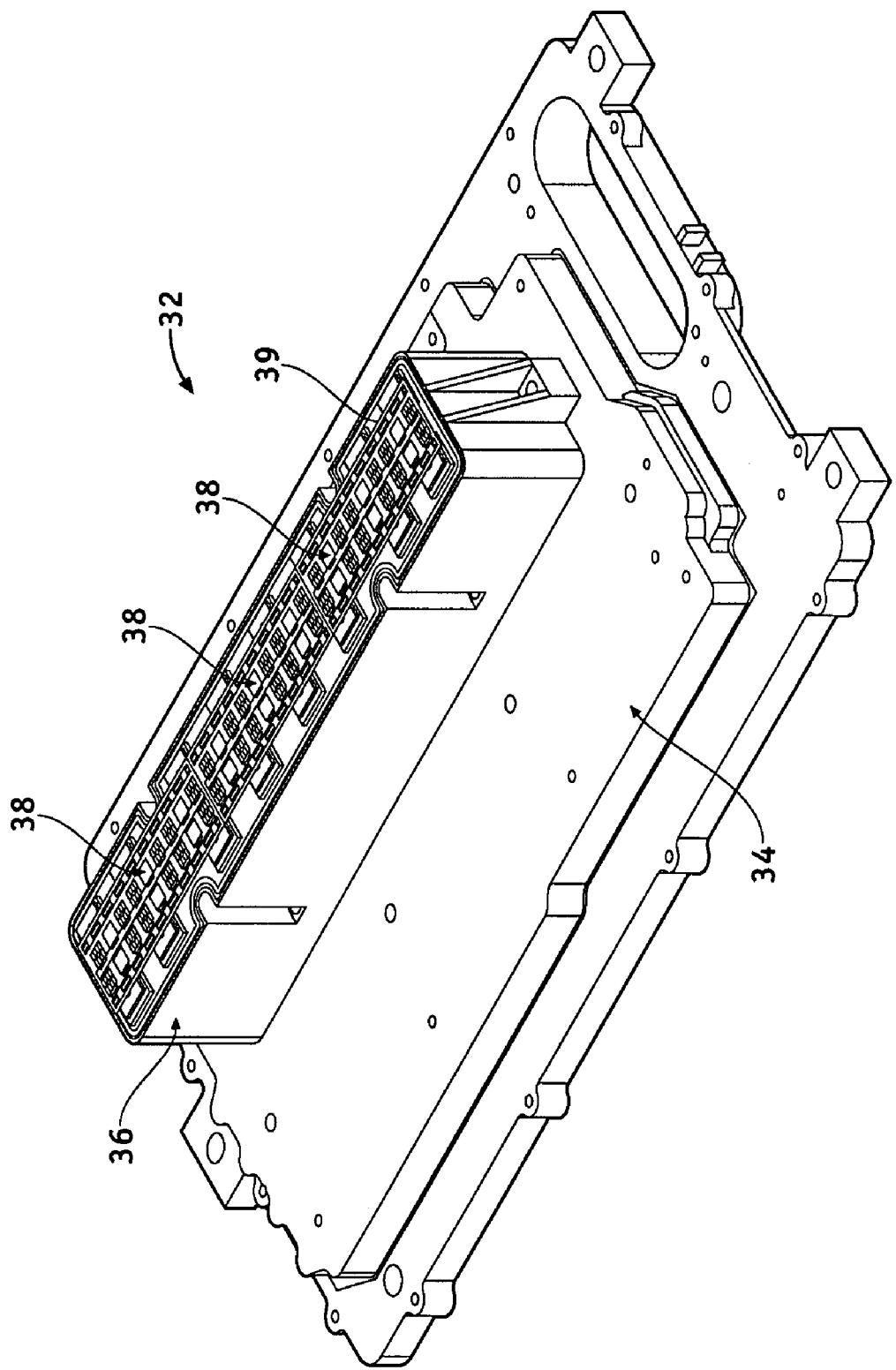
FIG. 4 illustrates a second exemplary component of a power inverter, in accordance with the present invention, where a substrate is mounted over a capacitor housing, shown in a three-dimensional representation.

FIG. 4 illustrates, conceptually and in accordance with the claimed subject matter, an implementation 32 where switches 38 are mounted over a capacitor 36. In the depicted embodiment, substrates 39, over which switches 38 are disposed or integrated, are seen.

In previously depicted FIGS. 2 and 3, a motivation for positioning a substrate including the switches 22 adjacent to the capacitor 14 was to provide for thermal conductivity of the heat generated by switches 22 into the coldplate 30. However, switches 22 and their integrated dies can be cooled from a top surface or the coldplate 30 sandwiched between the underside of the substrate and the top of the capacitor 14. One such method of cooling may involve utilizing a dielectric fluid which is sprayed on a top surface of the switches 22 and processed through a heat exchanger device. As one skilled in the art will appreciate, however, a variety of cooling techniques may be implemented to provide cooling to the top surface of the switches, and thereby alleviate a requirement of a coldplate 30 for thermal dissipation. In light of the described change in cooling techniques, a chassis 34 can be used to provide structural support to the capacitor 36 and switches 38 for implementation 32 instead of coldplate 30. As such, in the depicted embodiment, chassis 34 represents conceptually the replacement of a coldplate 30 with a chassis 34 to continue to provide structural support. However, in other embodiments, as will be seen, a chassis 34 is not necessary, as mechanical isolation can be provided through the use of a housing integrated over the capacitor.

Figure 5:
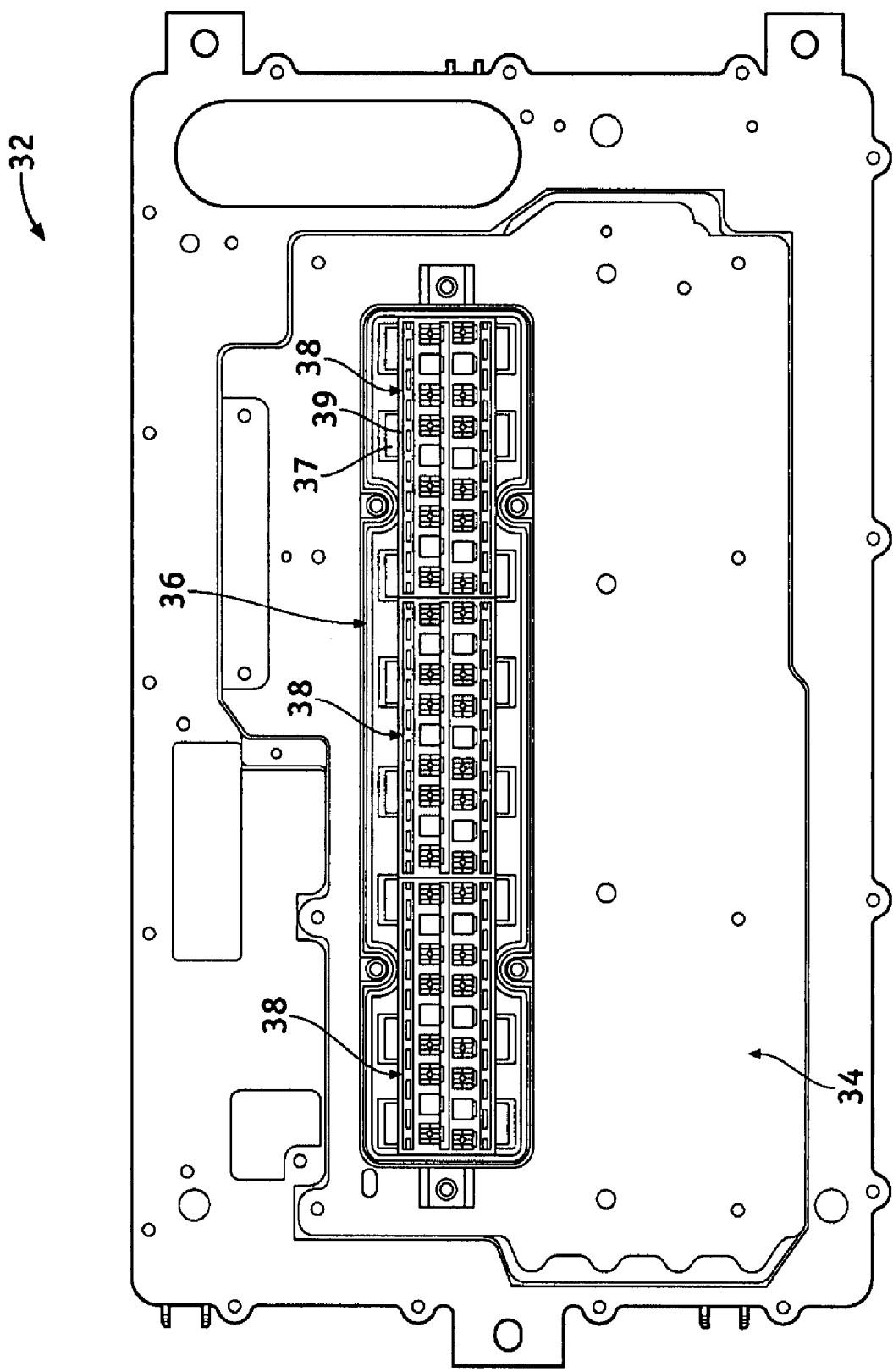
FIG. 5 illustrates a top view of the exemplary component of a power inverter depicted in FIG. 4.

FIG. 5 illustrates a top view representation of the implementation 32. Again switches 38 and substrates 39 are mounted directly to the capacitor 36. An output terminal of the capacitor 36 is directly connected to an input terminal of the substrate 39. As such, inductance between the capacitor and the substrates 39 and switches 38 is minimized. Here again, the switches 38 and substrates 39 are removed from adjacent the capacitor 36, freeing the surface area of the chassis 34 which would have been associated with the switches 38 and substrates 39. As a result, the footprint of implementation 32, and corresponding volume of implementation 32 can be made smaller, as the chassis 34 can be removed in other embodiments.

Figure 6:
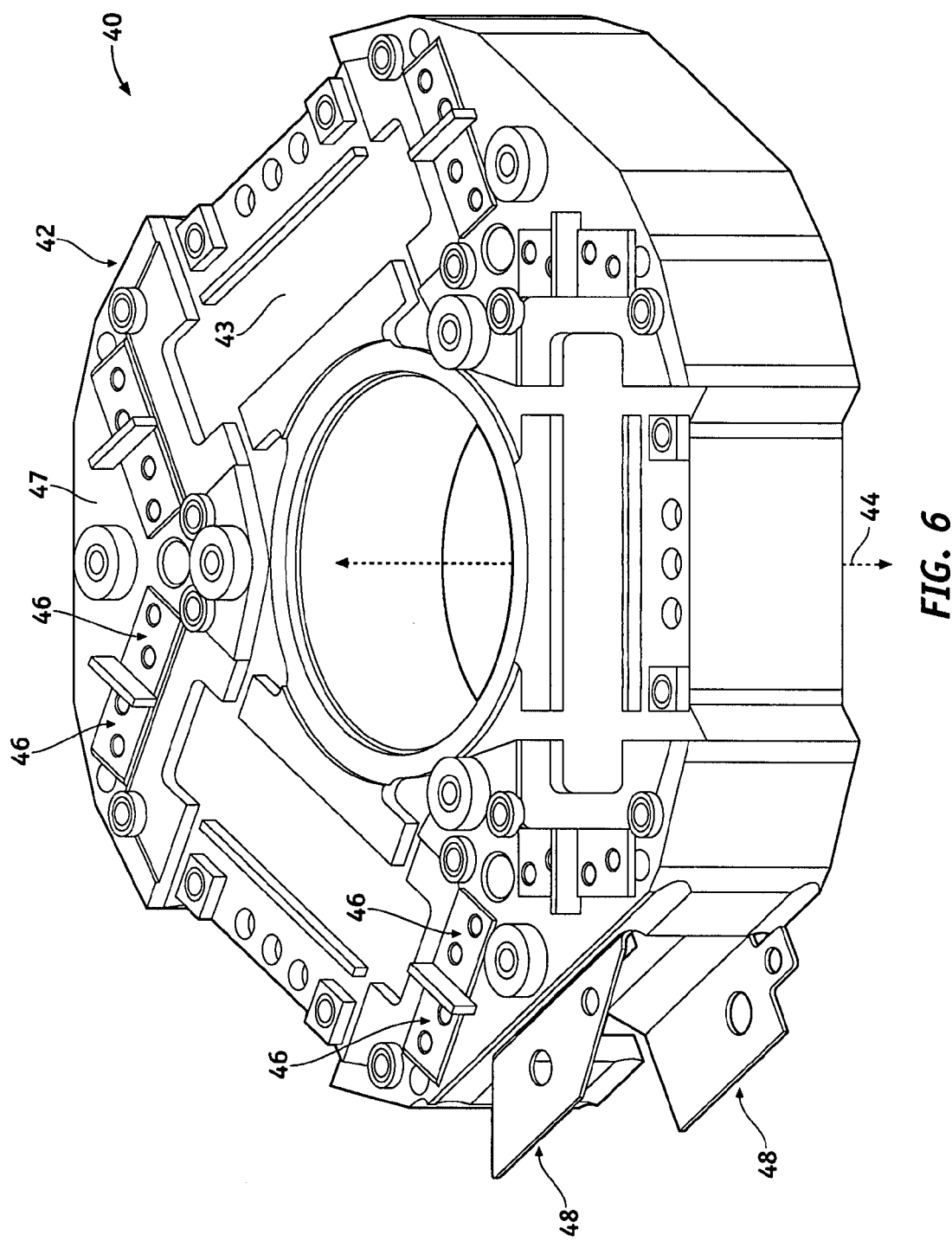
FIG. 6 illustrates a capacitor integrated into a housing, with a plurality of corresponding DC output terminals, shown in a three-dimensional representation.

FIG. 6 illustrates the result of removing a chassis to reduce the footprint of implementation 32, in an exemplary inverter component 40. A capacitor (not shown) may be integrated into or enclosed by a housing structure 42. A top surface 43 of the housing 42 may be conformed to receive a bottom surface of the substrates. The capacitor, and thereby, the housing 42 can be configured for a variety of applications. In the depicted embodiment 40, the capacitor and housing 42 are circularly disposed about an axis 44. Again, however, the capacitor and housing 42 can be configured in a variety of shapes and sizes. In one embodiment, the housing 42 provides vibration isolation to the capacitor, taking the place of a coldplate 30 or chassis 34. The housing 42 can be formed of a rigid thermoplastic material to provide adequate structural support to the capacitor and switch devices.

A series of output terminals 46 are formed over the substrate as shown. The terminals 46 may be square-shaped and flat as shown, or may be tailored for a specific application. The terminals 46 extend through the housing to connect with the capacitor. Similarly, input terminals of the capacitor can extend through the housing and be formed into bus terminal structures 48 (e.g., DC+ and DC−), for electrical connection to a DC power source. Busbars 48 are coplanar just under the substrate and the housing to reduce inductance.

Figure 7:
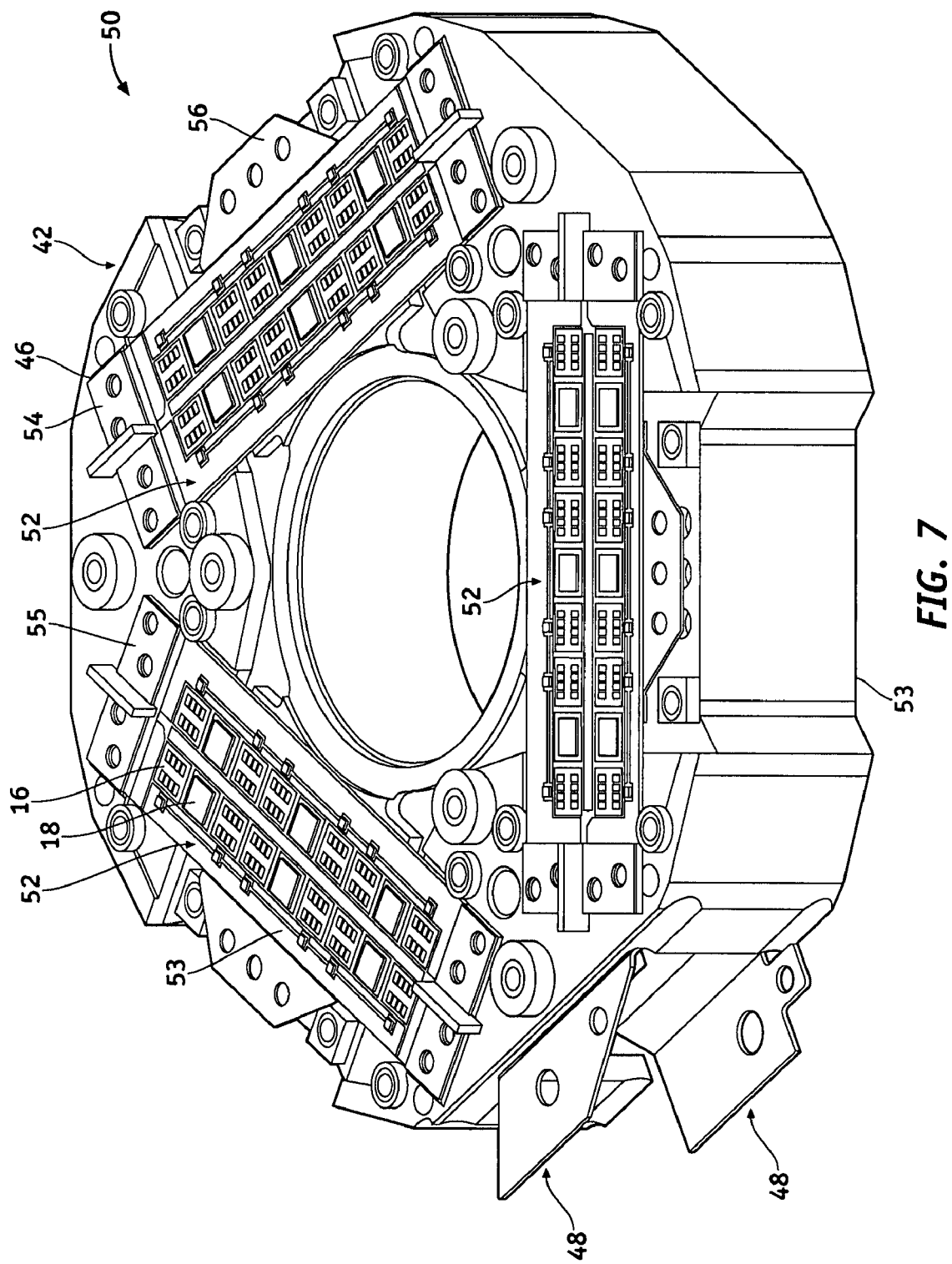
FIG. 7 illustrates the housing depicted in FIG. 6, where a plurality of substrates incorporating a plurality of power semiconductor switch devices is mounted over the housing, again shown in a three-dimensional view.

Turning to FIG. 7, an exemplary inverter component assembly 50 is depicted, which includes the previously illustrated component 40 with a series of switches 52 mounted thereon. The switches 52 are again, disposed over or integrated into a substrate 53, for structural support. Thermal cooling of the switches/dies 52 can be provided through a top surface cooling technique as previously described or the sandwiched configuration as previously described.

As seen, various input terminals of switches 52 and substrates 53 can be formed into tab structures 54, which extend out of, or from, the substrates 53 as seen. The physical structure of the tabs 54 can be formed to directly correlate with the output terminals 46 of the capacitor. For example, in FIG. 6, terminals 46 are square and substantially flat, having a series of mounting holes 47. Similarly, tabs 54 as depicted in FIG. 7 are square and substantially flat, where the mounting holes 55 of tabs 54 correspond (e.g., line up) to mounting holes 47 of terminals 46 for attaching a screw or bolt mechanism. As will be appreciated, however, other techniques, such as soldering and welding, can be used to directly join the tabs 54 with the terminals 46.

Direct connection of the tabs 54 with the terminals 46 substantially reduces or eliminates a busbar connection between the switches 52 and the capacitor. In the depicted embodiment 50, a series of fin structures 56 are integrated into the switches 52, and may be electrically incorporated into the substrates 53 (i.e., electrical paths formed through the substrate itself). Fins 56 may serve as the output terminals of the switches 52, providing an AC output for each respective leg/phase of a three-phase AC circuit. The fins 56 can be coupled to a motor or other load which uses the AC power.

By directly connecting the tabs 54 with the terminals 46, a minimum device 50 footprint and volume may be obtained. Again, a busbar connection and/or lead length may be reduced, which reduces associated inductance and increases the overall inverter performance. In addition, the component 50 has a reduced part count, resulting in a lower cost of fabrication.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A subcomponent for a power inverter module, comprising:
   a housing;
   a capacitor having a terminal and integrated into the housing;
   a substrate mounted on the housing;
   a power semiconductor switch incorporated into the substrate;
   at least one direct current (DC) tab coupled to the power semiconductor switch, wherein the at least one direct current (DC) tab is directly connected to the terminal of the capacitor, wherein the capacitor is disposed below the substrate; and
   a bus terminal extending from the housing and coupled to an input terminal of the capacitor for providing electrical connectivity to a power source, wherein the capacitor is disposed on the bus terminal.

2. The subcomponent for a power inverter module of claim 1, wherein the at least one direct current (DC) tab is connected to an input terminal of the power semiconductor switch.

3. The subcomponent for a power inverter module of claim 1, wherein the housing is mounted to a chassis for structural support.

4. The subcomponent for a power inverter module of claim 1, further including a DC bus bar coupled to an input terminal of the capacitor and integrated into the capacitor housing to provide electrical connectivity to a DC power source.

5. The subcomponent for a power inverter module of claim 1, wherein the capacitor is circularly disposed about a centerline.

6. The subcomponent for a power inverter module of claim 1, further including an alternating current (AC) terminal coupled to an output terminal of the power semiconductor switch and integrated into the capacitor housing to provide electrical connectivity to a load.

7. The subcomponent for a power inverter module of claim 1, wherein the direct current tab comprises a bus to transfer electricity from the capacitor to the substrate.

8. The subcomponent of claim 1, wherein the terminal comprises an end of the capacitor.

9. The subcomponent of claim 1, wherein the capacitor is attached to direct current (DC) bus terminals at two locations on opposite sides of the substrate.

10. The subcomponent of claim 1, wherein the substrate is mounted directly to the capacitor.

11. The subcomponent of claim 1, wherein the subcomponent includes only one capacitor.

* * * * *